Dec. 8, 1959 S. H. W. NAGEL 2,916,235
ARTICLE SUSPENDING HOOK STRUCTURE
Filed Dec. 7, 1955
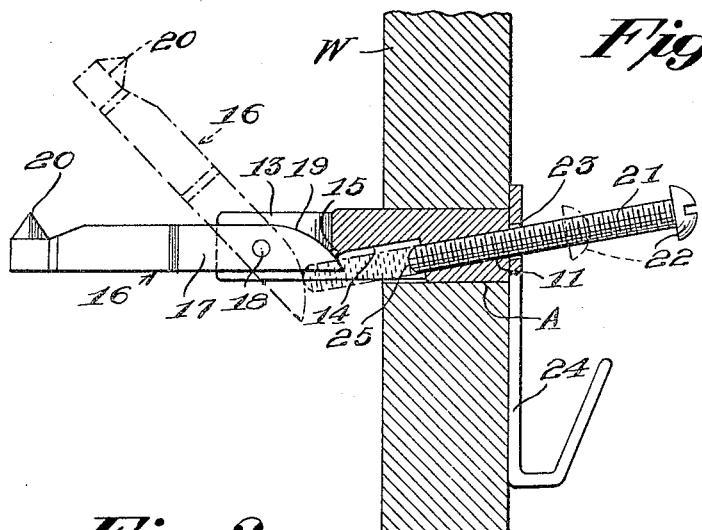
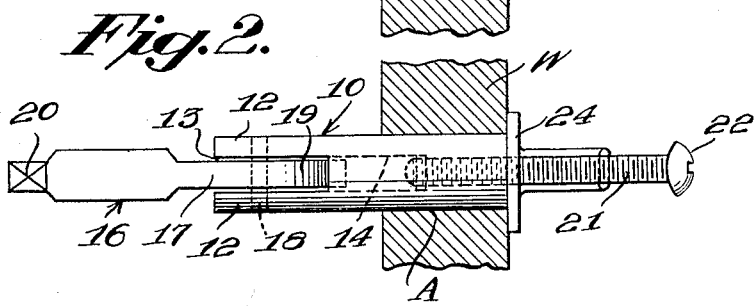
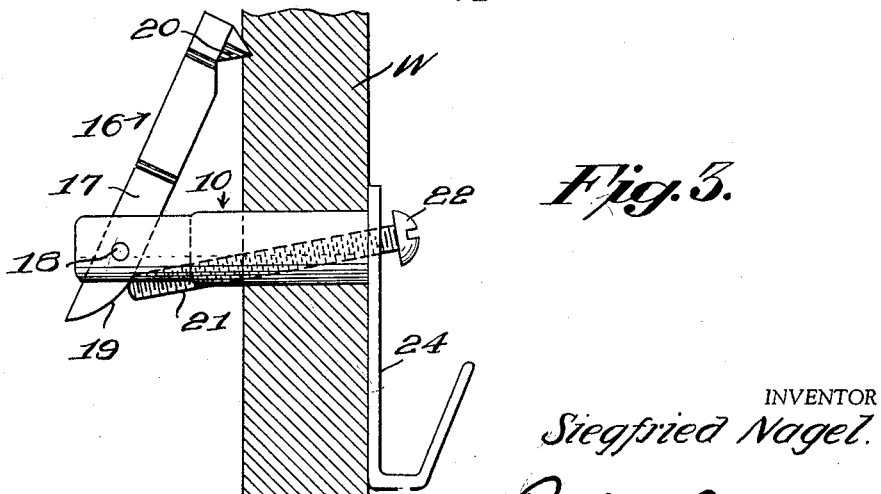
INVENTOR
Siegfried Nagel.
BY
ATTORNEY

United States Patent Office 2,916,235
Patented Dec. 8, 1959

2,916,235

ARTICLE SUSPENDING HOOK STRUCTURE

Siegfried Heinrich Wilhelm Nagel, St. Catherines, Ontario, Canada

Application December 7, 1955, Serial No. 551,607

1 Claim. (Cl. 248—29)

This invention relates to an article suspending hook structure.

The invention is more particularly concerned with a hook structure for supporting pictures, mirrors and the like and which is particularly characterized by hook supporting and retaining means including a body member which is removably insertable in an aperture in a wall and to which member a hook is supported exteriorly of the wall and which member further supports means for engaging the interior of the wall and which means is operable exteriorly of the wall.

It is a primary object of the invention to provide a hanger structure for pictures, mirrors, and the like which includes an elongated body portion insertable through an aperture in the wall and which body portion supports a pivoted member for engaging the interior of the wall and which is operated to and from wall engaging position by means which is readily accessible exteriorly of the wall.

A further object of the invention is the provision of a hanger structure which is highly dependable in use and which is capable of supporting substantially heavy pictures, mirrors and the like without any danger of such pictures and mirrors falling onto a floor and becoming broken.

A still further object of the invention is the provision of a hanger structure of the general character referred to which is relatively simple in construction and which is simple to install in a wall and equally simple to remove therefrom.

Other objects and advantages of the invention will become apparent in the course of the following detailed description, taken in connection with the accompanying drawing, wherein—

Fig. 1 is an elevational view, partly in section, showing the hanger structure in position in an aperture in a wall preparatory to securing same in position or removing same from the aperture in the wall.

Fig. 2 is a top plan view of the hanger structure as shown in Fig. 1.

Fig. 3 is an elevational view showing the hanger structure rigidly supported within the aperture in the wall.

Referring now in detail to the drawing, a portion of a wall is designated as W and which may be of the plaster board form.

The hanger structure comprises a cylindrical body member 10 which is removably insertable into an aperture A in the wall with its outer end flush with the outer surface of the wall and with its inner end projecting substantially beyond the inner surface thereof.

The body member 10 includes an outer solid portion which is provided with a threaded aperture 11 and which aperture is disposed at an acute angle to the axis of the member. The inner end of the member is bifurcated in the provision of spaced walls 12 having a slot 13 therebetween and the solid portion is provided with a recess 14 in communication with the slot 13 as well as the aperture 11, and which recess opens through the bottom of the body member 10.

At the juncture of the slot 13 and the recess 14 is a downwardly projecting stop lug 15 for a purpose later to appear.

A wall engageable locking member 16 is provided and same includes a relatively narrow shank 17 which is disposed within the slot 13 and a pivot pin 18 is extended through the shank and the said walls 12 of the body member 10.

The member 16 is provided with a convex edge 19 adjacent the pivot pin 18 and which edge normally engages the stop lug 15 as indicated in Fig. 1. The pivot pin 18 is disposed closer to the end of the member 16 which is provided with edge 19 than the opposite end whereby the member normally assumes its horizontal position as in Fig. 1 with said convex edge 19 engaged with the lug 15.

In order that the above noted normal position of member 16 may be positively dependable the said opposite end of the member is wider and heavier as is shown in Fig. 2.

The extreme opposite end of the member 16 is provided with a point 20 which in locked position of the hanger bites into the inner surface of the wall as is indicated in Fig. 3.

A relatively long screw 21 is threaded into the aperture 11 with its head 22 accessible exteriorly of the wall W. The screw 21 is extendable through an aperture 23 in the upper shank end of a hook 24 and the inner rounded end 25 of the screw is engageable with the convex edge 19 of the locking member 16.

In the use of the improved structure, same in its normal position in which the locking member 16 is disposed horizontally is capable of being readily pushed into a previously formed aperture A with the screw 21 in position and extending through the aperture 23 in the hook 24.

After the initial positioning of the structure, the screw 21 is driven inwardly until the end 25 thereof engages the convex edge 19 of the locking member 16 whereupon the locking member will be rotated clockwise about the pivot pin 18 as indicated by dotted lines in its initial movement in Fig. 1. In the continued rotation of the locking member, the point 20 will finally engage and penetrate the inner surface of the wall W as indicated in Fig. 3, wherein the structure is in its final and locked position.

In order to remove the hanger structure, the screw 21 is retracted and upon outward pull on the member 10 and hook 24, the locking member 16 will fall to its position in Fig. 1 whereupon the entire structure is capable of being retracted from the aperture A.

From the above it should be appreciated that the improved structure, while relatively simple and including relatively few parts, is capable of supporting relatively heavy weights from the hook 24 particularly due to the mounting of the body member 10.

While I have disclosed my invention in accordance with a single specific structural embodiment thereof, such is to be considered as illustrative only, the scope of the invention being defined in the sub-joined claim.

What I claim and desire to secure by U.S. Letters Patent is:

An article suspending hook structure comprising an elongated cylindrical body member insertable through an aperture into a wall, a hook member supported from the outer end of said body member, said body member including a solid outer portion provided with a threaded aperture disposed at an acute angle to the axis of the body member, said body member having spaced walls at its inner end defining a slot therebetween and having a recess opening through its lower side between the ends thereof in communication with said threaded aperture and said slot, said solid outer portion of said body member comprising a downwardly projecting stop lug at the inner end of said recess, an elongated locking member having a first end portion disposed in said slot in pivotal connection with said spaced walls, the end of the locking member adjacent the pivotal connection normally contacting said stop lug at the inner end of said recess with the locking member lying in parallel relation to the axis of the cylindrical body member, an elongated screw extending through said hook member and said threaded aperture into engagement with said first end of the locking member for pivoting it about its pivotal connection in order that its opposite end may engage the inner face of the wall, said locking member being provided at said opposite end with a pointed projection for penetrating the inner face of the wall to thereby lock said hook structure to the wall.

References Cited in the file of this patent

UNITED STATES PATENTS

| | | |
|---|---|---|
| 499,444 | Schumann | June 13, 1893 |
| 757,641 | Sanders | Apr. 19, 1904 |
| 2,072,066 | Cossentine | Feb. 23, 1937 |

FOREIGN PATENTS

| | | |
|---|---|---|
| 589,084 | Great Britain | June 11, 1947 |